Patented July 1, 1952

2,602,078

UNITED STATES PATENT OFFICE 2,602,078

SHORTSTOPPING EMULSION POLYMERIZATION OF CONJUGATED DIOLEFIN HYDROCARBONS WITH N-SUBSTITUTED DITHIOCARBAMATES

Walter A. Schulze and Willie W. Crouch, Bartlesville, Okla., assignors to Phillips Petroleum Company, a corporation of Delaware No Drawing. Application November 18, 1947, Serial No. 786,800

13 Claims. (Cl. 260—84.3)

This invention relates to the emulsion polymerization of polymerizable organic compounds. In one aspect it relates to the termination of the polymerization reaction when the desired conversion has been reached by the use of novel shortstopping agents. In one specific embodiment it relates to the copolymerization of butadiene and another comonomer copolymerizable therewith in an aqueous emulsion.

In the emulsion polymerization of monomeric materials, especially a butadiene-styrene mixture and similar comonomer systems, it is generally desirable to halt the reaction when a predetermined degree of conversion has been obtained. Such termination of the polymerization is usually effected by substances known as shortstopping agents, introduced into the reaction mixture when the desired conversion of monomers has been reached.

Among the shortstopping agents employed in the past, hydroquinone and sodium sulfide are widely known. However, the employment of these substances in emulsion polymerization reactions leads to many difficulties. Sodium sulfide impregnates the polymer with hydrogen sulfide, thereby rendering it undesirable because of a disagreeable odor. Hydroquinone imparts a brown color to the product which is often undesirable when white or light colored rubbers are to be manufactured. Furthermore the toxic properties of both sodium sulfide and hydroquinone give rise to a serious problem in the disposal of the serum residues after removal of the polymer.

We have now found that N-substituted dithiocarbamates are effective shortstopping agents for emulsion polymerization reactions, and that when these substances are employed, substantially improved properties are obtained in the polymers produced. The shortstopping agents of our invention comprise compounds of the formula

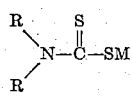

wherein

is a primary or secondary amine group, in which each R may be the same or different or may be comprised in a ring structure, and M is a metal, or ammonium, or a substituted ammonium group, typified by morpholine morpholyldithionate

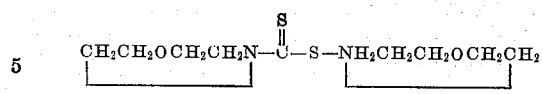

cyclohexyl sodium dithiocarbamate

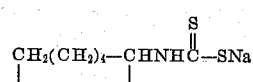

diethanol sodium dithiocarbamate

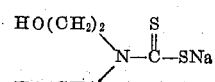

and the like. When M is a metal, it may be a monovalent or a polyvalent metal. In some instances unfavorable effects on the final product may result if M is ammonium, copper or iron. It is preferred that M be an alkali metal or a substituted ammonium group.

One object of this invention is to polymerize unsaturated organic compounds.

Another object of this invention is to produce an improved synthetic rubber.

A further object of this invention is to stop an aqueous polymerization.

Still another object of this invention is to polymerize hydrocarbons and produce an uncolored, rubbery polymer.

An additional object of our invention is to polymerize diolefins in aqueous emulsion and completely stop the polymerization at any desired extent of conversion.

A still further object of our invention is to polymerize unsaturated hydrocarbons in aqueous emulsion and quickly stop the polymerization at any desired extent of conversion.

Other objects and advantages of this invention will become apparent, to one skilled in the art, from the accompanying disclosure and discussion.

In the well known technique for the production of conventional butadiene-styrene rubber, an emulsion is prepared by suitable agitation of the following recipe:

| | | |
|---|---|---|
| Butadiene | parts | 75 |
| Styrene | do | 25 |
| Soap | do | 5 |
| Potassium persulfate | do | 0.3 |
| Water | do | 180 |
| Mercaptan | | Variable |
| (Usually about 0.05 to 1.4 parts) | | |

Polymerization is effected at a temperature of about 50° C. for approximately twelve hours, or until a conversion of about 75 per cent is obtained. In general, it is not desirable to continue the polymerization much beyond this point, due to the tendency for cross linking between the polymer units and consequent gel formation as the modifying agent (mercaptan) is depleted. Also, in the later stages of the reaction, the rate of polymerization is reduced to such a degree that higher conversions may be undesirable from a purely economic viewpoint. Obviously, unreacted monomers are present in the reaction mixture at any time previous to complete conversion. To prevent their continuing interaction beyond a predetermined stage, shortstopping agents are added when it is desired to halt the reaction. The substances employed for this purpose are generally reducing agents and in addition to their shortstopping action, serve as stabilizers by destroying any peroxide-type materials which may be present, and which, if permitted to remain, lead to cross linkage and deterioration of the polymer. The shortstopping agents are added to the mixture when the desired degree of conversion has been obtained and to secure their uniform action suitable means must be employed to obtain thorough dispersion throughout the reaction system.

The N-substituted dithiocarbamates employed in our process comprise the salts of N-substituted dithiocarbamic acids. Since dithiocarbamic acids in general are unstable substances, these products are necessarily prepared by indirect means, usually from the interaction of primary and secondary amines with carbon disulfide to provide the substituted ammonium dithiocarbamates, and subsequent treatment with a metal hydroxide to produce metal salts. In a copending application by W. W. Crouch, Serial No. 770,526, filed August 25, 1947, now Patent No. 2,563,007, a method is disclosed for the production of the alkali metal salts of N-substituted dithiocarbamic acids whereby the reactions are conducted concurrently in specific types of solvent media.

Since the said dithiocarbamates are, in general, water soluble, they can be conveniently introduced in water solution. In some instances the solubility of the substituted ammonium salt is relatively low and in such cases the corresponding alkali metal salt may be preferred.

The monomeric material polymerized to produce polymers by the process of this invention comprises unsaturated hydrocarbon compounds which generally contain the characteristic structure $CH_2=C<$ and, in most cases, have at least one of the disconnected valencies attached to an electronegative group, that is, a group which increases the polar character of the molecule such as an organic group containing a double or triple bond such as vinyl, phenyl, or the like. Included in this class of monomers are the conjugated butadienes, or 1,3-butadienes such as butadiene (1,3-butadiene), 2,3-dimethyl-1,3-butadiene, isoprene, piperylene, and the like; aryl olefins such as styrene, various alkyl styrenes, alphamethyl styrene, vinyl naphthalene and similar derivatives thereof, and the like; vinyl acetylene, and other unsaturated hydrocarbons of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, and similar compounds mentioned hereinabove. In this case the products of the polymerization are high molecular weight linear polymers and copolymers which are rubbery in character and come within the term synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

When operating according to the method of this invention temperatures may range from about −30 to about 70° C. with temperatures from about 0 to about 50° C. usually preferred. Obviously when polymerizations are carried out in aqueous emulsion in the absence of freezing point depressants, temperatures below the freezing point of water cannot be employed. The use of various additive agents, however, makes a process of the type disclosed herein applicable at lower temperatures. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature, whether or not the actual polymerization temperature is above or below 0° C. It is generally preferred that the emulsion be of an "oil in water" type, with the ratio of aqueous medium to monomeric material between about 0.5:1 and about 5:1, preferably about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

In addition to providing effective shortstopping action, the present invention has the very significant advantage of providing polymers that are substantially snow white. Products prepared in this manner are thus particularly adapted for use in the manufacture of white and light colored synthetic rubbers. A further advantage lies in the fact that the dithiocarbamate salts employed in our process are substantially non-toxic thus eliminating problems often inherent in the disposal of serum residues. A still further advantage of our invention lies in the substantially odor free polymers produced thereby.

The proportion of our N-substituted dithiocarbamates employed for halting the polymerization will be between about 0.1 and about 1.0 per cent by weight, of the original monomeric material, preferably about 0.15 to about 0.4 per cent. Uniform dispersion through the system may be effected by introduction of the desired amount in water solution while the polymerization mixture is suitably agitated. The shortstopping agents of this invention may be used when any of the usual polymerization catalysts for such reactions are employed, and they are particularly effective when oxidizing catalysts, such as potassium persulfate, and reducing-oxidizing compositions known as "redox" catalysts, are employed.

Advantages of this invention are illustrated by the following examples. The reactants, and their proportions, and the other specific ingredients of the recipes, are presented as being typical and should not be construed to limit the invention unduly.

Example I

A polymerization mixture was prepared employing the following recipe:

| | Parts |
|---|---|
| Butadiene | 75 |
| Styrene | 25 |
| Soap | 5 |
| Potassium persulfate | 0.3 |
| Water | 180 |
| Mercaptan (DDM) | 0.4 |

The mixture was charged to a polymerization reactor and agitated at a temperature of 50° C. for ten hours. A sample was removed and tested for degree of conversion and intrinsic viscosity. A shortstopping agent comprising 0.2 part of piperidinium pentamethylene dithiocarbamate,

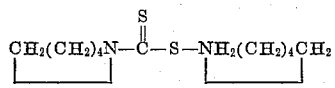

was added to the mixture, which was then agitated for seven [1] hours after which tests were again made for degree of conversion and intrinsic viscosity. Results of the tests were as follows:

| Time (Hrs.) | Conversion (Per Cent) | Intrinsic Viscosity | Benzene Solubility, Per Cent |
|---|---|---|---|
| 10 | 63.6 | 1.86 | 100 |
| 17 | 63.6 | 2.00 | 100 |

Example II

The run of Example I was repeated, employing 0.2 part of morpholine morpholyl dithionate,

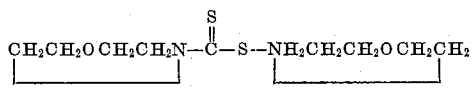

as the shortstopping agent. The results obtained are shown below:

| Time (Hrs.) | Conversion (Per Cent) | Intrinsic Viscosity | Benzene Solubility, Per Cent |
|---|---|---|---|
| 10 | 65.1 | 1.98 | 100 |
| 17 | 65.1 | 1.96 | 100 |

[1] The shortstopping action was, of course, immediate. The purpose of the seven hour agitation was to demonstrate experimentally the completeness of the shortstopping action, and would not be required in commercial operation.

Example III

The run of Example I was repeated using 0.2 part of beta-hydroxyethyl ammonium beta-hydroxyethyl dithiocarbamate,

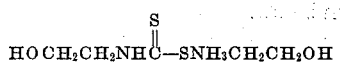

as shortstop, with the following results:

| Time (Hrs.) | Conversion (Per Cent) | Intrinsic Viscosity | Benzene Solubility, Per Cent |
|---|---|---|---|
| 11 | 66.5 | 2.26 | 100 |
| 18 | 66.7 | 2.18 | 100 |

Example IV

The run of Example I was carried out employing a shortstopping agent comprising 0.2 part of bis (beta-hydroxyethyl) ammonium bis (hydroxyethyl) dithiocarbamate,

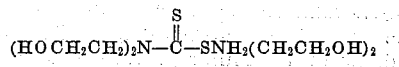

Results were as follows:

| Time (Hrs.) | Conversion (Per Cent) | Intrinsic Viscosity | Benzene Solubility, Per Cent |
|---|---|---|---|
| 11 | 66.3 | 2.18 | 100 |
| 18 | 65.9 | 2.18 | 100 |

Example V

The run of Example IV was repeated with a shortstop comprising 0.2 part sodium cyclohexyl dithiocarbamate. The results are shown below:

| Time (Hrs.) | Conversion (Per Cent) | Intrinsic Viscosity | Benzene Solubility, Per Cent |
|---|---|---|---|
| 10 | 61.9 | 1.88 | 100 |
| 17 | 61.7 | 1.94 | 100 |

Example VI

The run of Example I was carried out employing 0.2 part of the reaction product of ethylene diamine with carbon disulfide as shortstop. The results are shown below:

| Time (Hrs.) | Conversion (Per Cent) | Intrinsic Viscosity | Benzene Solubility, Per Cent |
|---|---|---|---|
| 10 | 59.1 | 1.98 | 100 |
| 17 | 58.1 | 1.87 | 100 |

Example VII

The run of Example I was repeated using 0.2 part of sodium morpholyl dithionate,

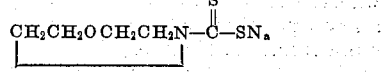

as the shortstop. The results were as follows:

| Time (Hrs.) | Conversion (Per Cent) | Intrinsic Viscosity | Benzene Solubility, Per Cent |
|---|---|---|---|
| 10 | 62.7 | 1.73 | 100 |
| 17 | 61.0 | 1.79 | 100 |

Example VIII

The run of Example VII was repeated using two polymerization mixtures and 0.15 part of sodium morpholyl dithionate as shortstop. The results are shown below.

| Run No. | Time (Hrs.) | Conversion (Per Cent) | Benzene Solubility (per cent) |
|---|---|---|---|
| 1 | 10 | 66.9 | 100 |
|   | 17 | 66.9 | 100 |
| 2 | 10 | 68.1 | 100 |
|   | 17 | 68.3 | 100 |

As will be evident to those skilled in the art, various modifications of this invention can be made, or followed, in the light of the foregoing disclosure and discussion, without departing from the spirit or scope of the disclosure or from the scope of the claims.

We claim:

1. In the production of a synthetic rubber by copolymerization in aqueous emulsion of a monomeric material comprising a major portion of butadiene and a minor portion of styrene using a mercaptan as a polymer modifier and potassium persulfate as reaction activator, the improvement which comprises adding to the reacting mixture, when a desired extent of conversion between 50 and 80 per cent conversion has been attained, a compound of the formula $$R_2N-\overset{S}{\underset{\|}{C}}-SM$$

wherein $R_2N-$ is of the group consisting of primary and secondary amine groups and M is a monovalent radical of the group consisting of alkali metal, ammonium, and substituted ammonium radicals, in an amount between 0.1 and 0.4 per cent by weight of said monomeric material to stop said copolymerization.

2. The improvement of claim 1 wherein said compound is a salt of an alkali metal.

3. The improvement of claim 1 wherein said compound is a salt of a basic carbon-containing nitrogen compound.

4. The improvement of claim 1 wherein said compound is sodium morpholyl dithionate.

5. The improvement of claim 1 wherein said compound is sodium cyclohexyl dithiocarbamate.

6. In the polymerization of an unsaturated hydrocarbon monomeric material comprising a major amount of a conjugated diolefin having four to six carbon atoms per molecule in aqueous emulsion, wherein the polymerization reaction is stopped prior to complete polymerization of said monomeric material by the addition of a shortstopping agent, the improvement which comprises adding to the reacting mixture a compound of the formula $$R_2N-\overset{S}{\underset{\|}{C}}-SM$$

wherein $R_2N-$ is of the group consisting of primary and secondary amine groups and M is a monovalent radical of the group consisting of alkali metal, ammonium, and substituted ammonium radicals, in an amount between 0.1 and 1.0 per cent by weight of said monomeric material to stop said polymerization.

7. The improvement of claim 6 wherein said compound is a salt of an alkali metal.

8. The improvement of claim 6 wherein said compound is a salt of a basic nitrogen compound.

9. The improvement of claim 6 wherein said compound is sodium morpholyl dithionate.

10. The improvement of claim 6 wherein said compound is sodium cyclohexyl dithiocarbamate.

11. In the production of a synthetic rubber by polymerization in aqueous emulsion of a monomeric material comprising a major portion of butadiene and a minor portion of styrene using a mercaptan as a polymer modifier and an oxidizing catalyst, the improvement which comprises adding to the reacting mixture, when between 50 and 80 per cent of said monomeric material is polymerized, beta-hydroxyethyl ammonium beta-hydroxyethyl dithiocarbamate in an amount between 0.1 and 1.0 per cent by weight of said monomeric material as a shortstopping agent, thereby stopping said polymerization.

12. In the production of a synthetic rubber by polymerization in aqueous emulsion of a monomeric material comprising a major portion of butadiene and a minor portion of styrene using a mercaptan as a polymer modifier and an oxidizing catalyst, the improvement which comprises adding to the reacting mixture, when between 50 and 80 per cent of said monomeric material is polymerized, a compound of the formula $$R_2N-\overset{S}{\underset{\|}{C}}-SM$$

wherein $R_2N-$ is of the group consisting of primary and secondary amine groups and M is a monovalent radical of the group consisting of alkali metal, ammonium, and substituted ammonium radicals, in an amount between 0.1 and 1.0 per cent by weight of said monomeric material to stop said polymerization.

13. In the polymerization of an unsaturated hydrocarbon monomeric material comprising a major amount of a conjugated diolefin having four to six carbon atoms per molecule in aqueous emulsion in the presence of a mercaptan as a polymerization modifier and in the presence of an oxidizing catalyst, wherein the polymerization reaction is stopped prior to complete polymerization of said monomeric material by the addition of a shortstopping agent, the improvement which comprises adding to the reacting mixture a compound of the formula $$R_2N-\overset{S}{\underset{\|}{C}}-SM$$

wherein $R_2N-$ is of the group consisting of primary and secondary amine groups and M is a monovalent radical of the group consisting of alkali metal, ammonium, and substituted ammonium radicals, in an amount between 0.1 and 1.0 per cent by weight of said monomeric material to stop said polymerization.

WILLIE W. CROUCH.
WALTER A. SCHULZE.

REFERENCES CITED

The following references are of record in the file of this patent:

UNITED STATES PATENTS

| Number | Name | Date |
|---|---|---|
| 2,234,204 | Starkweather et al. | Mar. 11, 1941 |
| 2,264,173 | Collins | Nov. 25, 1941 |
| 2,416,440 | Fryling | Feb. 25, 1947 |
| 2,430,562 | Fryling | Nov. 11, 1947 |